(12) United States Patent
Khosla et al.

(10) Patent No.: US 12,271,787 B2
(45) Date of Patent: Apr. 8, 2025

(54) ROBUST, SCALABLE AND GENERALIZABLE MACHINE LEARNING PARADIGM FOR MULTI-AGENT APPLICATIONS

(71) Applicant: HRL Laboratories, LLC, Malibu, CA (US)

(72) Inventors: Deepak Khosla, Camarillo, CA (US); Sean Soleyman, Calabasas, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 783 days.

(21) Appl. No.: 16/792,869

(22) Filed: Feb. 17, 2020

(65) Prior Publication Data

US 2020/0285995 A1 Sep. 10, 2020

Related U.S. Application Data

(60) Provisional application No. 62/814,133, filed on Mar. 5, 2019.

(51) Int. Cl.
*G06N 20/00* (2019.01)
(52) U.S. Cl.
CPC .................... *G06N 20/00* (2019.01)
(58) Field of Classification Search
CPC ...................................................... G06N 20/00
See application file for complete search history.

(56) References Cited

U.S. PATENT DOCUMENTS

| | | | | |
|---|---|---|---|---|
| 9,600,767 B1* | 3/2017 | Nogin | ....................... | G06N 5/04 |
| 10,648,790 B2* | 5/2020 | Foster | ....................... | G06T 7/73 |
| 10,732,639 B2* | 8/2020 | Palanisamy | .............. | G06N 3/08 |
| 10,977,551 B2* | 4/2021 | Van Seijen | ............ | G06N 5/043 |
| 11,210,585 B1* | 12/2021 | Heess | ....................... | G06N 3/08 |
| 2016/0292589 A1* | 10/2016 | Taylor, Jr. | ............... | G06T 9/002 |
| 2017/0116497 A1* | 4/2017 | Georgescu | ............. | G06N 3/006 |
| 2018/0018702 A1* | 1/2018 | Gibson | .............. | G06Q 30/0266 |
| 2018/0165603 A1* | 6/2018 | Van Seijen | ............ | G06N 3/045 |
| 2018/0357552 A1* | 12/2018 | Campos | ................. | G06N 5/043 |
| 2019/0130067 A1* | 5/2019 | Passerini | ................ | G16H 30/40 |
| 2019/0197244 A1* | 6/2019 | Fong | ...................... | G06N 20/00 |

(Continued)

OTHER PUBLICATIONS

Notification of and the International Preliminary Report on Patentability Chapter II for PCT/US2020/018532; date of mailing Apr. 1, 2021.

(Continued)

*Primary Examiner* — Oleg Survillo
*Assistant Examiner* — Abdelbasst Talioua
(74) *Attorney, Agent, or Firm* — TOPE-MCKAY & ASSOCIATES

(57) ABSTRACT

Described is a learning system for multi-agent applications. In operation, the system initializes a plurality of learning agents. The learning agents include both tactical agents and strategic agents. The strategic agents take an observation from an environment and select one or more of the tactical agents to produce an action that is used to control a platform's actuators or simulated movements in the environment to complete a task. Alternatively, the tactical agents produce the action corresponding to a learned low-level behavior to control the platform's actuators or simulated movements in the environment to complete the task.

18 Claims, 11 Drawing Sheets

(56) References Cited

U.S. PATENT DOCUMENTS

2019/0295282 A1\* 9/2019 Smolyanskiy .......... G06F 18/22
2020/0134461 A1\* 4/2020 Chai ...................... G06N 3/084
2021/0319362 A1\* 10/2021 Mguni ................... G06N 20/00

OTHER PUBLICATIONS

Claims for International Preliminary Report on Patentability Chapter II for PCT/US2020/018532; date of mailing Apr. 1, 2021.
D'Souza, M., et al., "Avionics self-adaptive software: towards formal verification and validation," International Conference on Distributed Computing and Internet Technology, LNCS, vol. 11319, Springer, First Online: Dec. 11, 2018, pp. 3-23.
Latek, M., et al., "Strategic Interactions in irregular warfare an agent-based model," 2009, 12 pages.
Vidal, R., et al., "Pursuit-evasion games with unmanned ground and aerial vehicles," Proceedings 2001 ICRA, IEEE International Conference on Robotics and Automation (Cat. No. 01CH37164), vol. 3, pp. 2948-2955.
Filippi, S., et al., "Oprimism in reinforcement learning and Kullback-Leibler divergence," 2010, 48th Annual Allerton Conference on Communication, Control, and Computing (Allerton), IEEE, 2010, pp. 115-122.
Notification of Transmittal, The International Search Report, and the Written Opinion of the International Searching Authority for PCT/US2020/018532; date of mailing Jun. 16, 2020.
Jederberg et. al., "Human-level performance in first-person multiplayer games with population-based deep reinforcement learning." Arxiv, 2018, pp. 1-42.
K. Frans et. al., "Meta Learning Shared Hierarchies." Arxiv, 2017, pp. 1-11.
Response to communication pursuant to Rules 161 (1) and 162 EPC for the European Regional Phase Patent Application No. EP207 12737.4, dated Apr. 22, 2022.
Office Action 1 for Chinese Patent Application No. 202080012630.4, dated Dec. 6, 2023.
English translation of Office Action 1 for Chinese Patent Application No. 202080012630.4, dated Dec. 6, 2023.
Response to Office Action 1 for Chinese Patent Application No. 202080012630.4, dated Feb. 1, 2024.
English translation of the Proposed Claims in the Response to Office Action 1 for Chinese Patent Application No. 202080012630.4, dated Feb. 1, 2024.
Notice of Allowance for Chinese Patent Application No. 202080012630.4, dated Mar. 29, 2024.

\* cited by examiner

Variable Definitions:
N = number of low-level agents (population size)
M = number of high-level agents (population size)
$\theta_{l\,0}$ to $\theta_{l\,N}$ contain learnable parameters for each low-level agent in the population
$\theta_{h\,0}$ to $\theta_{h\,M}$ contain learnable parameters for each high-level agent in the population
$F_l$ is a low-level matrix where each element measures fitness of row player w.r.t. column player
$F_h$ is a high-level matrix where each element measures fitness of row player w.r.t. column player
$q$ is a vector that limits the random variability of the environment

Process:
Randomly initialize the trainable parameters for all low-level agents, $\theta_{l\,0}$ to $\theta_{l\,N}$
Randomly initialize the trainable parameters for the high-level agents, $\theta_{h\,0}$ to $\theta_{h\,M}$
Initialize each element of fitness matrices $F_l$ and $F_h$ to 0
Initialize $q$ to specify a highly deterministic (easy to learn) environment
For each epoch j:
    For each episode e:
        Initialize trajectory t to an empty list
        For each step i:
            Randomly select a high-level agent x in [0, M), with a higher probability for low performers
            Use this high-level agent to select a behavior b in [0, N)
            Use the low-level agent corresponding to the selected behavior to select an action
            Append the start state, high-level action, low-level action, reward, and end state to t
        Apply a policy gradient update to $\theta_{h\,x}$
        Apply a policy gradient update to $\theta_{l\,b}$ with larger average learning rate for lower performers
    Re-calculate each element of $F_l$ and $F_h$ with wins minus losses from a fixed number of trials
Increase each element of $q$ so as to increase the stochasticity of the environment (curriculum)

FIG. 7B

Variable Definitions:
N = number of low-level agents (population size)
$\theta_{l\,0}$ to $\theta_{l\,N}$ contain learnable parameters for each low-level agent in the population
$\theta_h$ contains the learnable parameters for the high-level agent
F is a matrix for where each element measures fitness of the row player w.r.t. the column player
q is a vector that limits the random variability of the environment

Process:
Randomly initialize the trainable parameters for all low-level agents, $\theta_{l\,0}$ to $\theta_{l\,N}$
Randomly initialize the trainable parameters for the high-level agent, $\theta_h$
Initialize each element of fitness matrix F to 0
Initialize q to specify a highly deterministic (easy to learn) environment
For each epoch j:
    For each episode e:
        Initialize trajectory t to an empty list
        For each step i:
            Use the high-level agent defined by $\theta_h$ to select a behavior b in [0, N)
            Use the low-level agent corresponding to the selected behavior to select an action
            Append the start state, high-level action, low-level action, reward, and end state to t
        Apply a policy gradient update to $\theta_h$
        Apply a policy gradient update to $\theta_{l\,b}$ with larger average learning rate for lower performers
    Re-calculate each element of F with wins minus losses from a fixed number of trials
Increase each element of q so as to increase the stochasticity of the environment (curriculum)

FIG. 7C

ROBUST, SCALABLE AND GENERALIZABLE MACHINE LEARNING PARADIGM FOR MULTI-AGENT APPLICATIONS

CROSS-REFERENCE TO RELATED APPLICATIONS

This application claims the benefit of and is a non-provisional patent application of U.S. Provisional Application No. 62/814,133 filed on Mar. 5, 2019, the entirety of which is hereby incorporated by reference.

BACKGROUND OF INVENTION

(1) Field of Invention

The present invention relates to a multi-agent learning system and, more specifically, to a learning system implementing a scalable and generalizable machine learning paradigm for multi-agent applications.

(2) Description of Related Art

Reinforcement learning (RL) systems are employed in a variety of applications to learn from past decisions or scenarios in order to enhance new decision-making actions. Most work is directed to single-agent scenarios which is unrealistic in a real-world scenario. Some researchers have attempted to address this deficit by looking at multi-agent interactions. By way of example, the work of Jederberg et. al. is directed to population-based learning (see the List of Incorporated Literature References, Literature Reference No. 1). Specifically, Jederberg et. al. showed that an agent can achieve human-level learning in a popular 3D multi-player first-person video game, Quake III Arena Capture the Flag, using only pixels and game points as input. Although the work demonstrated enhanced learning, the process was limited to simple inputs in certain known scenarios.

K. Frans et al. described a different approach using hierarchically structured policies, improving sample efficiency on unseen tasks through the use of shared primitives (see Literature Reference No. 2). Although the work of K. Frans et al. is able to work on unseen tasks, the work has two major limitations. First and foremost, it provides no mechanism for promoting the development of a diverse set of low-level behaviors. It is possible that one high-performing behavior will be selected much more frequently than all the others. This would create a vicious cycle where the other behaviors do not get used, and fall further and further behind due to lack of training. Second, the work does not incorporate a systematic approach for curriculum learning. This reduces the likelihood that any useful low-level behaviors will arise in challenging environments, where it may take too long for standard reinforcement learning methods to encounter a good solution through random exploration.

Thus, a continuing need exists for a learning system that uses curriculum learning for a variety of difficult, uncertain, and random scenarios to improve learning and decision making regarding resulting low-level actions.

SUMMARY OF INVENTION

The present disclosure provides a learning system for multi-agent applications. In one aspect, the system comprises one or more processors and a memory. The memory is a non-transitory computer-readable medium having executable instructions encoded thereon, such that upon execution of the instructions, the one or more processors perform several operations, such as initializing a plurality of learning agents, the learning agents including both tactical agents and strategic agents; causing one or more strategic agents to take an observation from an environment and select one or more of the tactical agents to produce an action that is used to control a platform's actuators or simulated movements in the environment to complete a task; and causing one or tactical agents to produce the action corresponding to a learned low-level behavior to control the platform's actuators or simulated movements in the environment to complete the task.

In another aspect, the system performs operations of: training the learning agents to maximize a reward function returned by the environment; maintaining a fitness level for each learning agent during training, where the fitness level represents an average of a net reward obtained by the learning agent from each episode of training; and selecting one or more learning agents for additional training, based on their fitness with respect to a collective fitness of the learning agents.

In yet another aspect, the system comprises an operation of adapting one or more of the plurality of learning agents to perform a new task in a new domain by performing one or more operations selected from a group consisting of: re-training a high-level strategy network to produce an optimal behavior, where optimality is based on maximizing reward signals obtained from episodes in the new domain; re-training one or more low-level behavior networks to produce optimal behavior in the new domain; or adding and training new behaviors and re-training the high-level strategy network to select these new behaviors based on maximizing reward signals from the new domain.

In another aspect, each learning agent is trained in an initial state space, the initial state space being a set of all possible conditions that may exist in a simulated environment at a start of a training episode.

In yet another aspect, the initial state space is sequentially expanded after at least two of the learning agents have fitness levels within a predetermined threshold.

In another aspect, a difficulty of obtaining positive rewards increases during training.

Further, training of learning agents is terminated if no improvement is made for a predetermined number of episodes. For example, improvement is measured by an increase in the exponential moving average of the net reward from each episode.

In another aspect, different learning agents are initialized and trained with different hyperparameters (e.g., learning rate, number of network layers, or number of network nodes per layer).

In yet another aspect, the low-level behavior includes a behavior selected from a group consisting of pursuit of opponents, evasion of opponents, and evasion of enemy projectiles (e.g., missiles).

In another aspect, a function is used for reinforcement learning by the learning agents, the function is based on a Kullback-Leibler divergence between an action probability distribution selected by a strategic agent that is being trained with reinforcement learning, and an average of all probability distributions for all of other strategic agents in the population.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 7B is example pseudocode for the process as depicted in FIG. 7A in which there are two populations of agents;

FIG. 7C is example pseudocode for a simplified version of the process as depicted in FIG. 7A, with just one high-level agent;

DETAILED DESCRIPTION

Figure 1:
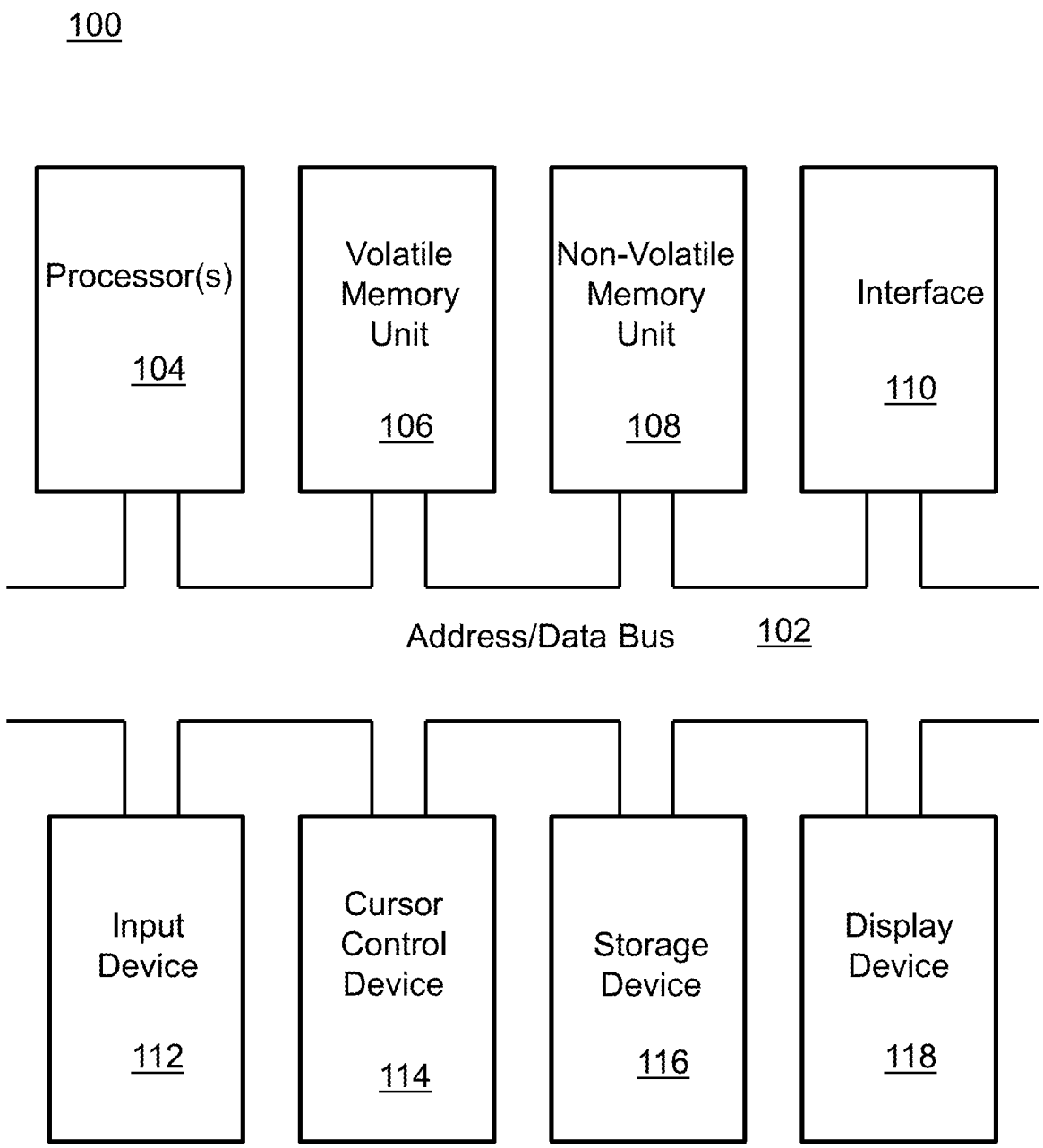
FIG. 1 is a block diagram depicting the components of a system according to various embodiments of the present invention.

The present invention relates to a multi-agent learning system and, more specifically, to a learning system implementing a scalable and generalizable machine learning paradigm for multi-agent applications. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) LIST OF INCORPORATED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. Jederberg et. al., "Human-level performance in first-person multiplayer games with population-based deep reinforcement learning." Arxiv, 2018.
2. K. Frans et. al., "Meta Learning Shared Hierarchies." Arxiv, 2017.

(2) PRINCIPAL ASPECTS

Various embodiments of the invention include three "principal" aspects. The first is a learning system for multi-agent applications. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
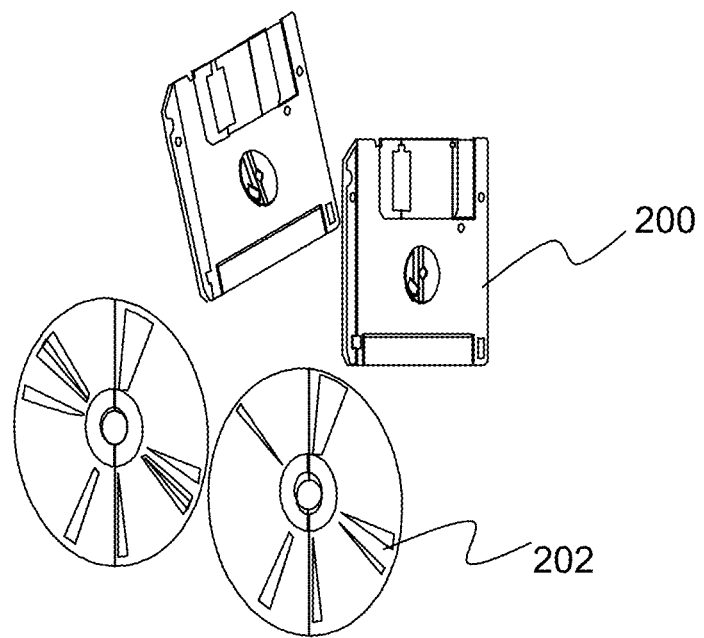
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

This disclosure describes a learning system for generating autonomous behaviors in multi-agent applications, such as M versus N air-to-air engagements with an arbitrary number of friendly units (M) and enemy units (N). The system extends prior art in reinforcement learning and makes it more robust, scalable and generalizable. Key innovations include: (1) Population-based Curriculum Learning (PCL) for robustness by randomized ad-hoc self-play and evolving population of adversaries with diverse skills acquired by playing sequentially complex mini-games, (2) Hierarchical Temporal Learning (HTL) for scalability via a hierarchical architecture where high-level behaviors (e.g., engage enemy) are learnt from low-level actions (e.g., speed control) and re-used for composable decision-making, thereby managing search space complexity and reducing decision-making to behavior selection, and (3) Behavior Adaptation Learning (BAL) for generalizability by rapid adaptation of trained models (e.g., air engagement) to new problems (e.g., VIP escort) by re-using previously learnt behaviors and only learning the required few new behaviors. These innovations provide improved performance in robustness, scalability, and generalizability. Taken together, these new learning techniques allow the system to develop strategies and tactics that work well against a large space of possible opponent strategies, in various environments.

As can be appreciated by those skilled in the art, the system can be applied to a variety of applications with multiple interacting agents, including autonomous vehicles (such as autonomous aircraft to provide air-to-air combat capabilities), simulations (such as simulated opponents and simulated behaviors for the purposes of determining likely outcomes of an air engagement scenario or other scenarios), battlefield management, etc. Other non-limiting examples of applications include multi-agent applications such as sports and cybersecurity. Specific details are provided below.

(4) SPECIFIC DETAILS OF VARIOUS EMBODIMENTS

Figure 3:
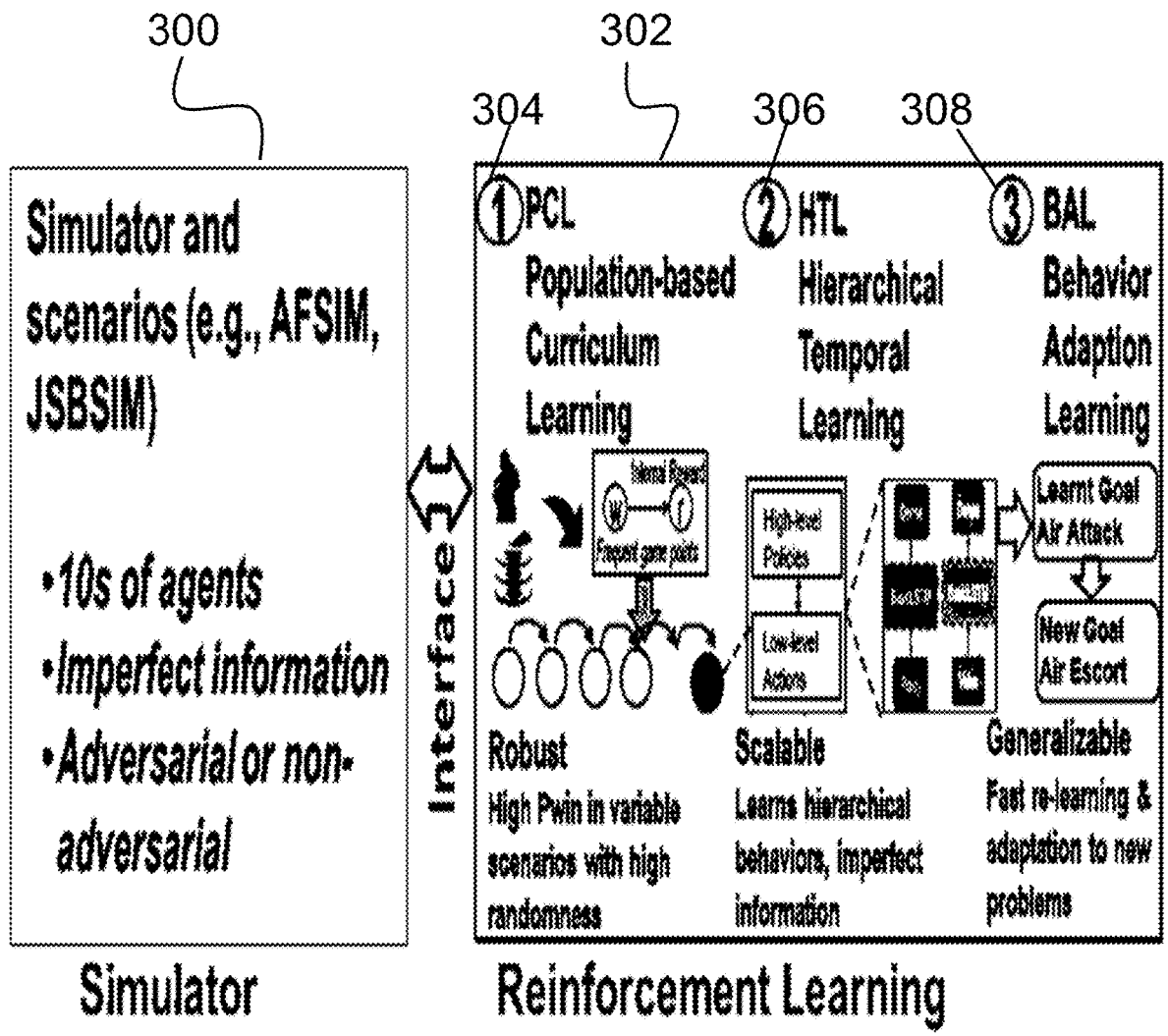
FIG. 3 is a system overview according to various embodiments of the present invention.

The system produces strategies and tactics for multi-agent problems and applications. The system is based upon several novel innovations that significantly extend prior art in reinforcement learning. As shown in FIG. 3, the described system interacts with an environment (e.g., a high-fidelity multi-agent simulator 300) for several episodes and adjusts the policy and value networks in a reinforcement learning paradigm 302 each time in order to improve upon a measure of effectiveness (reward function in reinforcement learning). The reward function almost always includes, at the end of each episode, a positive component for winning or a negative component for losing. The reward function may also include additional signals throughout the episode to encourage specific behaviors such as a negative reward for wasting assets (e.g., missiles) or a positive reward for destroying each enemy unit. The system includes three major innovations, depicted in FIG. 3 and detailed below.

Traditional reinforcement learning approaches can be used to produce a point-solution by playing out the exact same scenario repeatedly. However, it is important for the policies to be robust—for them to be able to generalize to different scenarios. Thus, the system described herein includes key innovations that improve upon state-of-the-art reinforcement learning systems. Key innovations include: (1) Population-based Curriculum Learning (PCL) 304 for robustness by randomized ad-hoc self-play and evolving population of adversaries with diverse skills acquired by playing sequentially complex mini-games, (2) Hierarchical Temporal Learning (HTL) 306 for scalability via a hierarchical architecture where high-level behaviors (e.g., engage enemy) are learnt from low-level actions (e.g., speed control) and re-used for composable decision-making, thereby managing search space complexity and reducing decision-making to behavior selection, and (3) Behavior Adaptation Learning (BAL) 308 for generalizability by rapid adaptation of trained models (e.g., air engagement) to new problems (e.g., VIP escort) by re-using previously learnt behaviors and only learning the required few new behaviors.

(4.1) Module 1: Population-based Curriculum Learning (PCL)

The PCL 404 module is a population-based training protocol, where each agent (or learner) is trained against a population of opponents. In the work of Jederberg et. al., all agents were evolved using a genetic algorithm that can result in fit agents with a narrow set of skills (see Literature Reference No. 1). However, in a unique approach as provided by the present disclosure (a first aspect), each agent in the population is trained by curriculum learning and the state space is sequentially expanded after the agents have learned good behaviors in a smaller space, thereby creating a pool of fit agents with diverse skills and encouraging robust adversarial learning. For example, the agent may first be trained in an environment where the opponent always starts out right in front of the agent that is learning to perform air engagement maneuvers. Once the agent has learned to maneuver into position to attack from this consistent starting position, the range of possible opponent bearings (determined randomly at the start of each episode) may be sequentially expanded first to 10 degrees, then to 20 degrees, and eventually all the way up to 360 degrees. For the purpose of determining when to proceed with these expansionary steps, one can define "good behavior" by the attainment of a certain average net reward from a fixed number of past episodes. Alternatively, one can simply provide a pre-determined schedule where the number of episodes between each expansion is expected to provide sufficient time for good behavior to be developed before each step.

An agent is defined as a subsystem that is capable of selecting low-level or high-level actions (e.g., low-level tactical agents and high-level strategic agents, respectively)—using a deep neural net in the preferred embodiment of this invention. Each agent in the population is trained by the method commonly known as policy gradient reinforcement learning. Curriculum learning is also employed, as described in the next paragraph.

The initial state space is defined as the set of all possible conditions that may exist in the environment at the start of an episode. The size of this initial state space is as small as possible if the environment starts out in the same state for every episode (e.g., all aircraft are placed at fixed positions). The initial state space is large if the environment can start out in many different (random) configurations (e.g., opponents are placed randomly anywhere within a 10 km radius). Curriculum learning is defined as the sequential expansion of this initial state space as training progresses. As an example: in a one versus one air engagement scenario (with aircraft as agents), the opponent may be placed at a fixed distance of 5 km from the friendly aircraft. After the system has been trained for 100,000 episodes, this distance can be made to vary randomly within [4 km, 6 km]. After each subsequent set of 100,000 episodes, the random range can be increased in the same manner until it reaches the full range of [0 km, 10 km] that may be encountered in operation.

Figure 4:
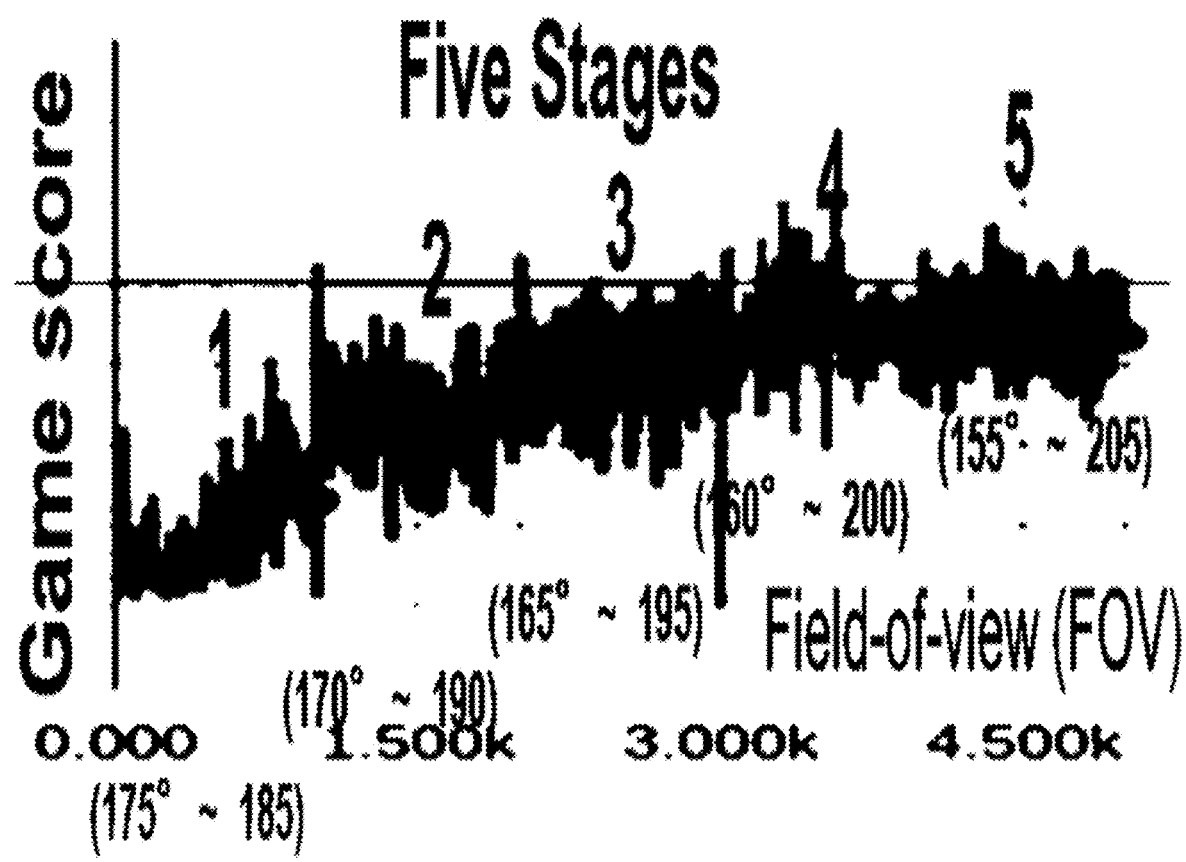
FIG. 4 is a graph illustrating results from curriculum learning according to various embodiments of the present invention.

As shown in FIG. 4, a one versus one (1v1) pilot study has demonstrated robust learning with a curriculum learning strategy. Specifically, FIG. 4 shows that the score continues to increase over 5 stages of training, during which the "field of view" (relative bearing of the enemy) increases from 10 degrees to 50 degrees.

The PCL 404 module employs a large number of ad-hoc games (simulated air-to-air engagements) with variable numbers of agents, capabilities, behaviors and hyper-parameters to enable robust learning in diverse scenarios and against a broad range of opponent strategies. A random initialization procedure ensures that each ad-hoc game is unique. For example: one game may consist of two opponents directly in front of one friendly aircraft, and another may consist of two opponents directly behind. It is also possible to vary capabilities, such as weapon range, sensor angle, etc., to make the learned models even more robust. It is possible for different agents in a population to be given different hyper-parameters, such as learning rate.

Figure 5:
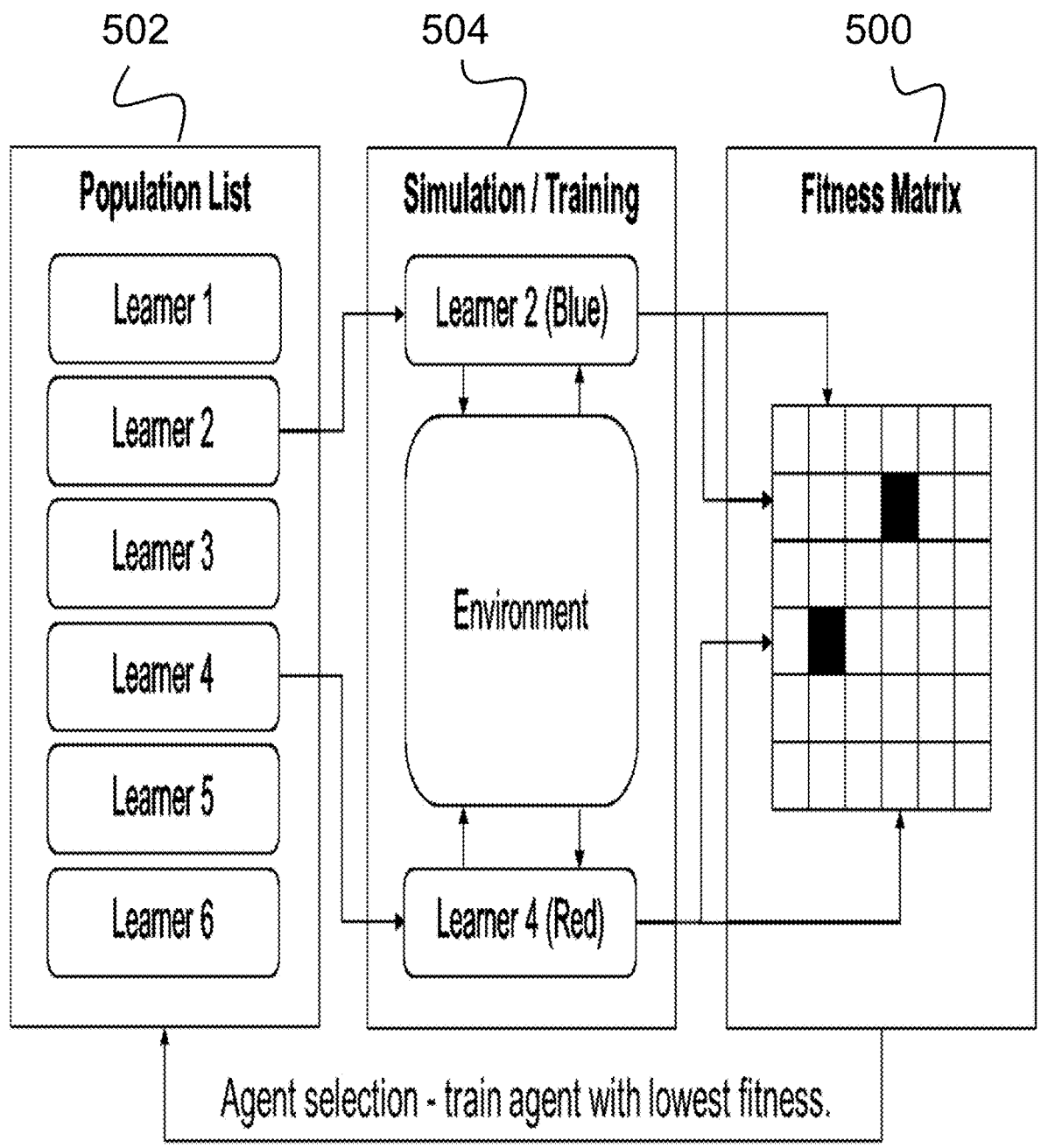
FIG. 5 is a flowchart illustrating dynamic population Training in PCL according to various embodiments of the present invention.

In a second aspect and as shown in FIG. 5, a group of agents is trained in such a way that a uniform fitness level is maintained across the entire population. A desired method for maintaining this constraint is to create a fitness matrix 500, which compares the relative fitness of any two agents (e.g., Learning 2 and Learner 4). This fitness matrix is square, with the number of rows and columns each being equal to the number of agents in the population. Each entry of the fitness matrix contains the number of wins minus the number of losses, computed based on a number of evaluation runs (approximately 1000 to 10000 in our experiments) of the player indexed by the row measured against the player indexed by the column. For example, the fitness entry in row 2, column 4 represents the number of wins by Learner 2 minus the number of losses by Learner 2 from a number of episodes played between Learner 2 against Learner 4. In the case of a symmetric zero-sum game where both players start out with the same distribution of possible starting conditions and one player wins if the other loses, the matrix is anti-symmetric (the matrix is equal to the negative of its transpose). This implies that for improved computational efficiency, it is possible to assume that the diagonal entries are zero and that half of the remaining entries can be computed by negating the other half. For example, the fitness of Learner 4 as measured against Learner 2 is simply the negative of the fitness of Learner 2 as measured against Learner 4. Agents with a marginally lower fitness level are trained more intensively, so that they do not fall too far behind the rest of the group. In this aspect, agents with fitness levels less than other agents are further trained to maintain the collective fitness of the plurality of agents within a predetermined threshold.

This dynamic population 502 allows the system to develop more robust strategies for exploring the space of possible behavior policies. Each agent (or learner) goes through a simulation/training 504 process. When training 504 each learner, a loss function term is applied that prevents the learner from adopting strategies that are similar to those of other learners in the population. This could take the form a Kullback-Leibler divergence between the action probabilities of the new learner with respect to those of one or more other learners.

Figure 6:
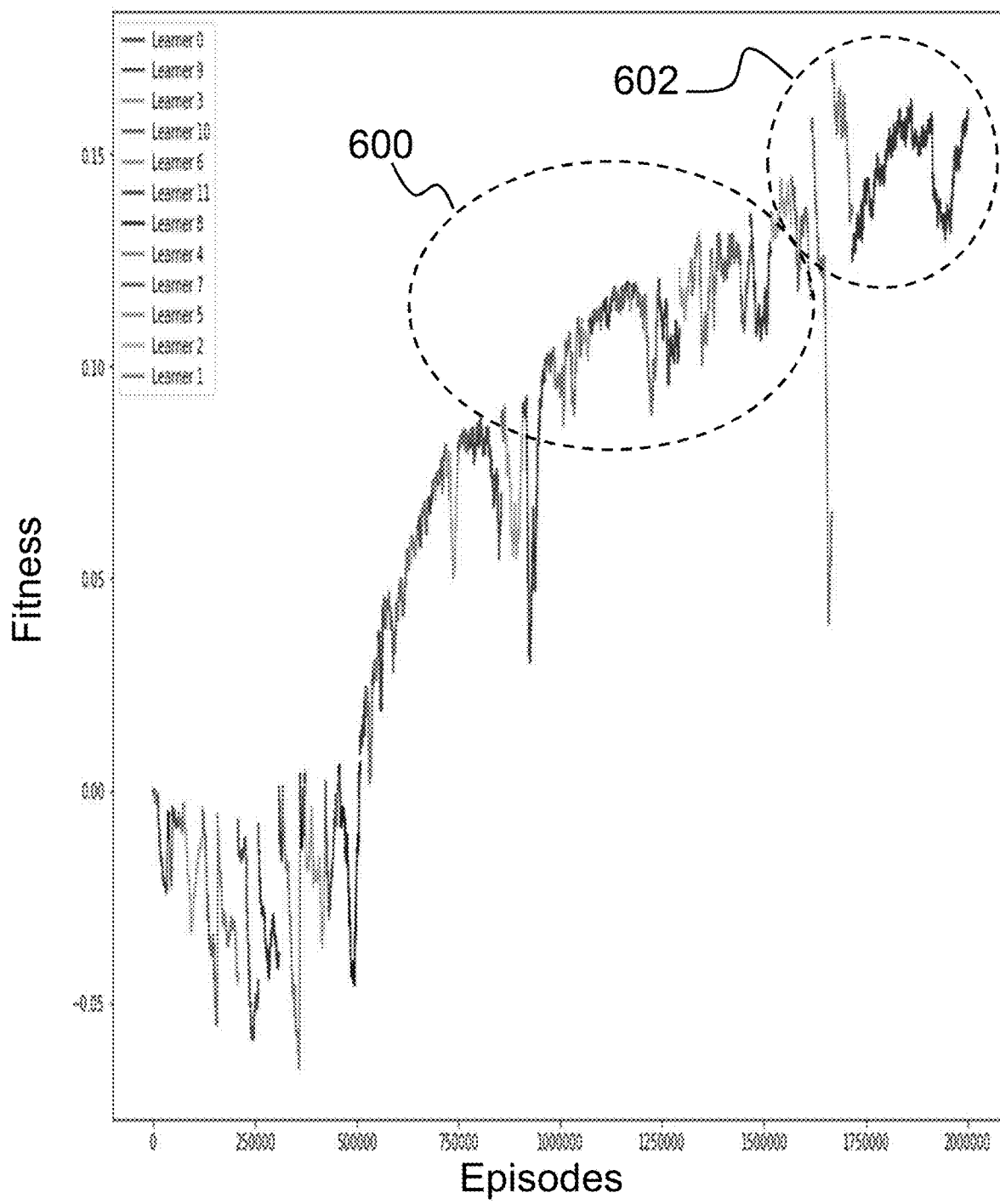
FIG. 6 is a graph depicting testing results using a training method according to various embodiments of the present invention.

The process as depicted in FIG. 5 has been reduced to practice and implemented for experiments. For example, FIG. 6 shows the result of testing this training method using a group of 12 agents (i.e., learners). In the early stages of training, the fitness of each agent stays close to 0 since this particular fitness matrix uses a zero-sum fitness function. Eventually, some of the agents reach a plateau 600 and the process stops training them to focus on more-promising agents that continue to increase their fitness. This can be done after an agent shows little or no improvement for a certain number of episodes. As a non-limiting example, in the experiment that resulted in FIG. 6, training was terminated if no improvement was achieved after 50,000 episodes. In this case, the agent would be frozen at its current learned state, and henceforth used only as an opponent against which to train other agents. Because of this, the fitness score for the other agents 602 begins to increase, resulting in the upward trend shown in FIG. 6.

(4.2) Module 2: Hierarchical Temporal Learning (HTL)

The search space of multi-agent games is intractably large. For example, the game tree size for a typical four versus four (4v4) engagement with four control actions (five choices for speed, heading, altitude, fire or not fire, 1000 time steps) is 1011500. To address this issue, the system described herein employs hierarchical reinforcement learning to segment these complex problems into more manageable behaviors (subtasks), to learn to perform the behaviors effectively, and to learn the sequences in which the behaviors should be executed to complete the original task. For the same 4v4 problem and assuming 10 high-level behaviors each lasting 100 time steps, this approach has a significantly smaller game tree size of 1040.

In a first aspect of HTL 306, the high-level tasks are specified manually by an analyst based on known tactics. The low-level actions to accomplish each of these tasks are learned independently (e.g., using 1v1 reinforcement learning). Alternatively, the low-level actions can be provided as scripted behaviors that are pre-programmed rather than learned, such as pursuing an opponent, firing and supporting a missile, or evading incoming missiles. These tasks may include simple behaviors such as flying to a designated location, or more complex behaviors such as engaging an opponent in combat.

The HTL 306 approach then uses reinforcement learning to learn the optimal sequence of the high-level tasks to accomplish goals (e.g., successful battle management). The optimal sequence of the high-level tasks is determined by a single high-level agent that takes in observations and selects tasks by using a neural net that is trained using policy gradient reinforcement learning. For example: the high-level agent may learn to select the "engage opponent" task in situations where doing so is advantageous, and it may learn to select a different high-level task such as "evade" in situations where a more defensive course of action is most effective in maximizing game score. For further understanding, FIG. 7C provides example pseudocode for a simplified version with a single high-level agent.

In a second aspect of HTL 306, both the high-level and low-level tasks and policies are trained end-to-end within a single learning network. In order to improve convergence rate and handle partial observability, the HTL 306 module will use the temporal history of all state variable (inputs) and a recurrent neural network (RNN) as part of the policy and value modules of reinforcement learning. It was previously demonstrated that addition of RNN is useful in improving training convergence and speed for one versus one learning even under full observability. For example, an RNN added after the value network improved the win rate of an agent in the first batch of training from 69% to 80%.

Figure 7A:
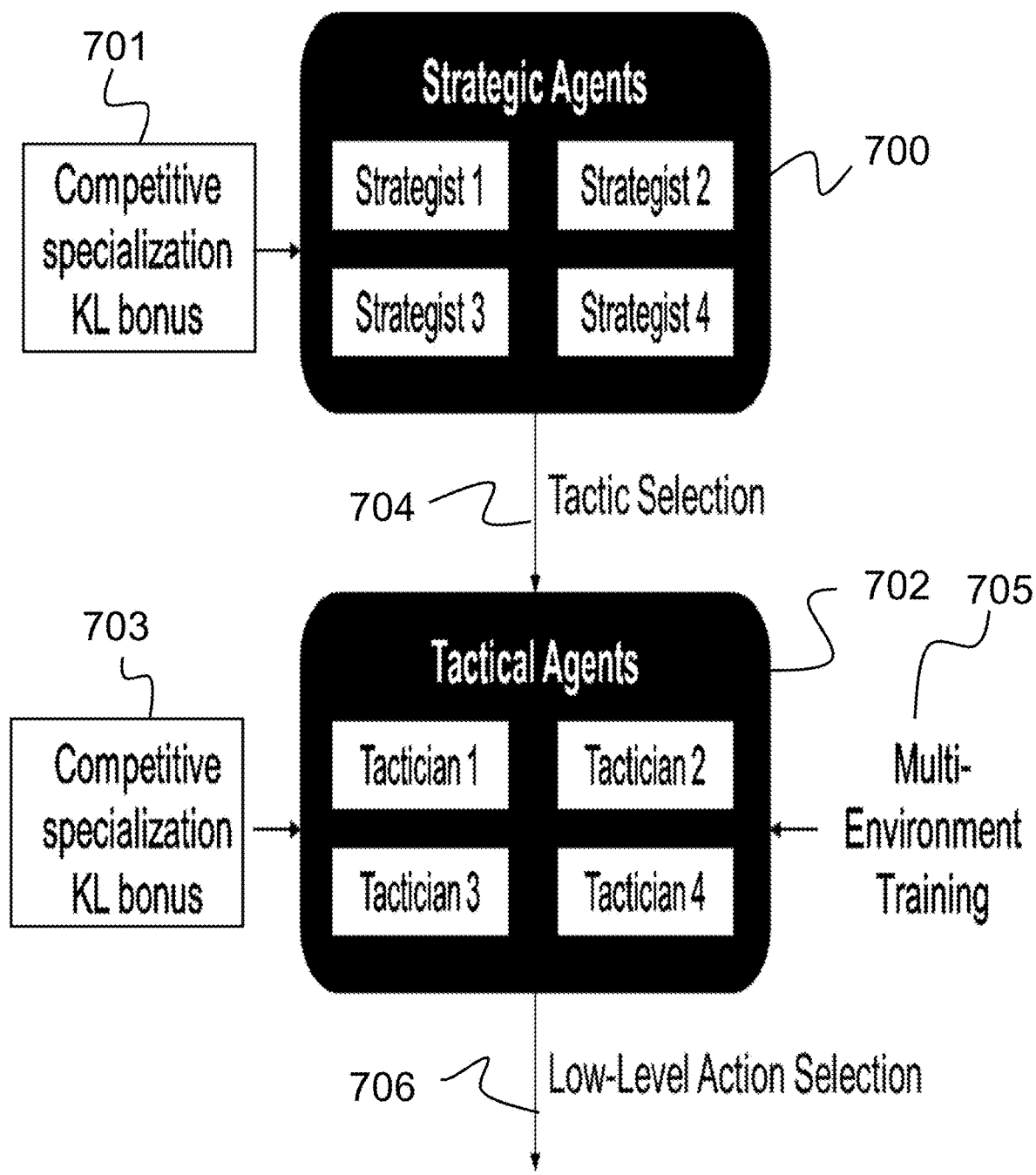
FIG. 7A is a flowchart depicting hierarchical learning with two populations according to various embodiments of the present invention.

In a third aspect and as shown in FIG. 7A, hierarchical learning is combined with population-based training by using separate populations of strategic 700 and tactical 702 agents. Strategic agents 700 decide on a high-level strategy by selecting a tactical agent 704 from the population, while tactical agents 702 produce an actual low-level action 706. FIG. 7A illustrates this hierarchical population-based architecture, where there are actually two separate populations of agents 700 and 702. As shown in FIG. 7A, a first competitive specialization KL bonus 701 is introduced to the strategic agents 700. The first competitive specialization KL bonus 701 is computed as the Kullback-Leibler divergence between the action probability distribution selected by the strategist that is being trained with reinforcement learning, and the average of all the probability distributions for all of the other strategists in the population. This loss term is added to the reinforcement learning loss function. Thereafter, a second competitive specialization KL bonus 703 (similar to 701, but calculated based on the population of tactical agents) and multi-environment training 705 are introduced to the tactical agents 702, which produce the low-level actions 706.

For further understanding, FIG. 7B provides pseudocode for the process as depicted in FIG. 7A in which there are two populations. It should be understood that the invention is not intended to be limited to working with two populations of agents but, instead, can work with more or less, such as shown in FIG. 7C.

(4.3) Module 3: Behavior Adaptation Learning (BAL)

Figure 8:
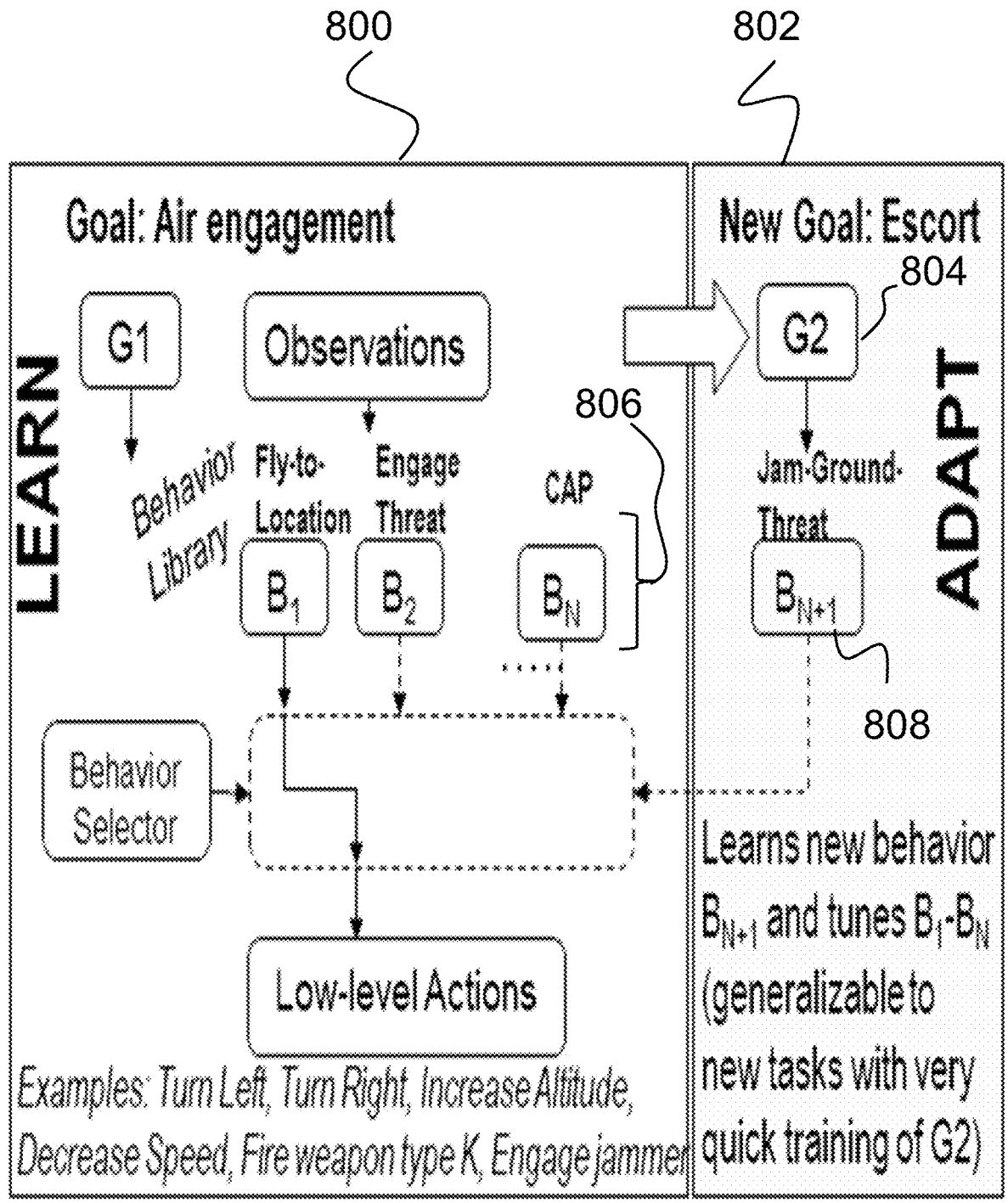
FIG. 8 is a flowchart depicting behavior adaptation learning according to various embodiments of the present invention.

The objective of the BAL 308 module is to adapt a previously trained artificial intelligence (AI) model to a new problem. For example and as shown in FIG. 8, an air-to-air engagement strategy 800 may need to be adapted for a very important person (VIP)-escort management scenario 802 with new ground threat entities 804. Several previously learnt behaviors 806 are common to both problems (e.g., engage threat, fly-to-location, combat air patrol (CAP)), but new behaviors 808 need to be learned for the new problem (e.g., jam-ground-threat). The hierarchical learning approach is well suited to address this challenge by training a new high-level goal and few new behaviors, while making use of previously learned behaviors for a similar set of tasks. An agent with a sufficient stock of such behaviors will be more able to adapt to variability in the scenario or goal. In one aspect, the trained system from one problem domain is used with the weights of the policy and value networks being adjusted using reward signals from the second problem domain to optimize learning for this domain. The new behavior required for the second problem domain is then added, with the network then being retrained to optimize incremental rewards for this domain. This process can be iterated several times until convergence is achieved.

For example, a hierarchical agent capable of two low-level behaviors may first be trained for 100,000 episodes of air-to-air engagements. At this point, it will have learned a high-level strategy for air-to-air engagements and two low-level behaviors that may be useful for air-to-air engagements as well as other possible types of military scenarios. Hypothetically, one low-level behavior could consist of pursuing the opponent and the other could consist of evading. The high-level strategy could consist of selecting the pursuit behavior if the starting position is advantageous, and the evasive behavior otherwise. Next, if an autonomous solution for a VIP-escort problem is required, the policy network and/or value network defining the high-level strategy can be re-trained for 10,000 episodes in this new scenario while the networks representing the low-level pursuit and evade behaviors are frozen since the pursuit and evade behaviors are still likely to be useful. Next, a third behavior may be added by providing a freshly-initialized policy and value network to represent it as well as an additional output neuron allowing the strategy network to select it. Both the new networks and the new output neuron can then be trained for another 10,000 episodes, while the rest of the model weights are either frozen or trained jointly. Several iterations of similar re-training procedures may be applied until the agent is able to perform well in the new environment.

This approach presents two major benefits. First, it is likely that a pre-trained agent can be adapted to a new scenario with fewer training episodes than would be necessary to train the agent from scratch. Since some of the low-level behaviors can be re-used, the transfer learning problem is simpler than the problem of training an agent from scratch. Second, this adaptive approach may allow the agent to learn effective strategies for scenarios that would otherwise be too complex to solve. The agent can use a simple scenario to learn simple behaviors, which can then be used to bootstrap learning in a more difficult scenario where a non-adaptive agent would only receive negative rewards from every episode, and would never be able to start learning.

(4.4) Control of a Device

Figure 9:
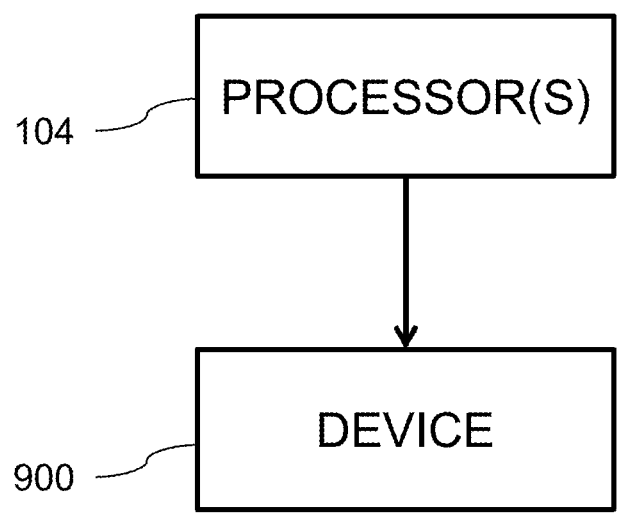
FIG. 9 is a block diagram depicting control of a device according to various embodiments.

As shown in FIG. 9, the one or more processors 104 may be used to control a device 900 (e.g., an autonomous vehicle, a motor, a machine, a drone, a camera, etc.) based on the low-level action selection. In some embodiments, the device 900 is the agent or learning agent that may be controlled to cause to move or otherwise initiate a physical action based on the action selection. The primary application in this category of embodiments is for autonomous control of unmanned combat air vehicles that can maneuver in such a way as to maximize their likelihood of completing mission objectives, such as defending a friendly aircraft or striking an enemy target. Motion of the aircraft can be controlled at the actuator level or at the autopilot level, and other control signals for weapon firing, etc. will also be generated.

More specifically and in one example, the embodiment shown in FIG. 8 can be within the device 900. The commands to turn left, turn right, increase altitude, increase speed, fire weapon K, engage jammer would be issued within device 900 to an unmanned UAV also part of the device 900. The commands may be transmitted wirelessly to an UAV. The strategic and tactical agents may be instantiations of objects in the device 900 while the commands to control the UAV's actuators.

For example, a user can use the invention to task or re-task a constellation (plurality) of UAVs for a particular machine that is not in the original training set of missions. Assume N behaviors (low-level) were previously learnt and now (N+1)th new behavior is additionally needed for the new mission type. Assume the UAV is loaded with the new required (N+1)th mission behavior either at start of the mission before takeoff or wirelessly added during the mission operation. Section 4.3 above describes how to train and adapt the neural network to accomplish this; both training the new low-level behavior and the high-level strategy selector. Assume that the network was re-trained per above; the system is then able to select any of (N+1) behaviors at each time step to execute its actions from the learnt low-level behavior neural network. Everything here is exactly the same as before with just one additional behavior and its action execution.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A computer implemented method for multi-agent applications, the method comprising:
    training a plurality of learning agents to maximize a reward function returned by an environment, the learning agents including both tactical agents and strategic agents, and wherein each learning agent is trained in an initial state space, the initial state space being a set of all possible conditions that may exist in the environment at a start of a training episode, and wherein the initial state space is sequentially expanded through a series of increasingly larger environments after at least two of the learning agents have fitness levels within a predetermined threshold for each expansion, wherein the initial state space is sequentially expanded through a series of increasingly larger environments by sequentially increasing the field-of-view of each learning agent;
    wherein training the plurality of learning agents includes maintaining a fitness level for each learning agent during training, where the fitness level represents an average of a net reward obtained by the learning agent from each episode of training, and selecting one or more learning agents for additional training, based on their fitness with respect to a collective fitness of the learning agents, such that those learning agents that show improvement with the fitness level are provided the additional training, while those learning agents that show no improvement with the fitness level after a predetermined number of episodes are frozen at their current learned state and used as opponents for the additional training;
    taking, by one or more strategic agents, an observation from the environment and select one or more of the tactical agents to produce an action that is used to control a platform's actuators or simulated movements in the environment to complete a task; and
    producing, one or more tactical agents, the action corresponding to a learned low-level behavior to control the platform's actuators or simulated movements in the environment to complete the task.

2. The method as set forth in claim 1, further comprising an operation of adapting one or more of the plurality of learning agents to perform a new task in a new domain by performing one or more operations selected from a group consisting of:
    re-training a high-level strategy network to produce an optimal behavior, where optimality is based on maximizing reward signals obtained from episodes in the new domain;
    re-training one or more low-level behavior networks to produce optimal behavior in the new domain; or
    adding and training new behaviors and re-training the high-level strategy network to select these new behaviors based on maximizing reward signals from the new domain.

3. The method as set forth in claim 1, where a difficulty of obtaining positive rewards increases during training.

4. The method as set forth in claim 1, where different learning agents are initialized and trained with different hyperparameters.

5. The method as set forth in claim 1, wherein the low-level behavior includes a behavior selected from a group consisting of pursuit of opponents, evasion of opponents, and evasion of enemy projectiles.

6. The method as set forth in claim 1, wherein a function is used for reinforcement learning by the learning agents, the function is based on a Kullback-Leibler divergence between an action probability distribution selected by a strategic agent that is being trained with reinforcement learning, and an average of all probability distributions for all of other strategic agents in the population.

7. A learning system for multi-agent applications, the system comprising:
    one or more processors and a memory, the memory being a non-transitory computer-readable medium having executable instructions encoded thereon, such that upon execution of the instructions, the one or more processors perform operations of:
        training a plurality of learning agents to maximize a reward function returned by an environment, the learning agents including both tactical agents and strategic agents, and wherein each learning agent is trained in an initial state space, the initial state space being a set of all possible conditions that may exist in the environment at a start of a training episode, and wherein the initial state space is sequentially expanded through a series of increasingly larger environments after at least two of the learning agents have fitness levels within a predetermined threshold for each expansion, wherein the initial state space is sequentially expanded through a series of increasingly larger environments by sequentially increasing the field-of-view of each learning agent;
        wherein training the plurality of learning agents includes maintaining a fitness level for each learning agent during training, where the fitness level represents an average of a net reward obtained by the learning agent from each episode of training, and selecting one or more learning agents for additional training, based on their fitness with respect to a collective fitness of the learning agents, such that those learning agents that show improvement with the fitness level are provided the additional training, while those learning agents that show no improvement with the fitness level after a predetermined number of episodes are frozen at their current learned state and used as opponents for the additional training;
        taking, by one or more strategic agents, an observation from the environment and select one or more of the tactical agents to produce an action that is used to control a platform's actuators or simulated movements in the environment to complete a task; and
        producing, by one or more tactical agents, the action corresponding to a learned low-level behavior to control the platform's actuators or simulated movements in the environment to complete the task.

8. The learning system as set forth in claim 7, further comprising an operation of adapting one or more of the plurality of learning agents to perform a new task in a new domain by performing one or more operations selected from a group consisting of:

re-training a high-level strategy network to produce an optimal behavior, where optimality is based on maximizing reward signals obtained from episodes in the new domain;

re-training one or more low-level behavior networks to produce optimal behavior in the new domain; or adding and training new behaviors and re-training the high-level strategy network to select these new behaviors based on maximizing reward signals from the new domain.

9. The learning system as set forth in claim 7, where a difficulty of obtaining positive rewards increases during training.

10. The learning system as set forth in claim 7, where different learning agents are initialized and trained with different hyperparameters.

11. The learning system as set forth in claim 7, wherein the low-level behavior includes a behavior selected from a group consisting of pursuit of opponents, evasion of opponents, and evasion of enemy projectiles.

12. The learning system as set forth in claim 7, wherein a function is used for reinforcement learning by the learning agents, the function is based on a Kullback-Leibler divergence between an action probability distribution selected by a strategic agent that is being trained with reinforcement learning, and an average of all probability distributions for all of other strategic agents in the population.

13. A computer program product for multi-agent applications, the computer program product comprising:

a non-transitory computer-readable medium having executable instructions encoded thereon, such that upon execution of the instructions by one or more processors, the one or more processors perform operations of:

training a plurality of learning agents to maximize a reward function returned by an environment, the learning agents including both tactical agents and strategic agents, and wherein each learning agent is trained in an initial state space, the initial state space being a set of all possible conditions that may exist in the environment at a start of a training episode, and wherein the initial state space is sequentially expanded through a series of increasingly larger environments after at least two of the learning agents have fitness levels within a predetermined threshold for each expansion, wherein the initial state space is sequentially expanded through a series of increasingly larger environments by sequentially increasing the field-of-view of each learning agent;

wherein training the plurality of learning agents includes maintaining a fitness level for each learning agent during training, where the fitness level represents an average of a net reward obtained by the learning agent from each episode of training, and selecting one or more learning agents for additional training, based on their fitness with respect to a collective fitness of the learning agents, such that those learning agents that show improvement with the fitness level are provided the additional training, while those learning agents that show no improvement with the fitness level after a predetermined number of episodes are frozen at their current learned state and used as opponents for the additional training;

taking, by one or more strategic agents, an observation from the environment and select one or more of the tactical agents to produce an action that is used to control a platform's actuators or simulated movements in the environment to complete a task; and producing, by one or more tactical agents, the action corresponding to a learned low-level behavior to control the platform's actuators or simulated movements in the environment to complete the task.

14. The computer program product as set forth in claim 13, further comprising instructions executed by the one or more processors to perform an operation of adapting one or more of the plurality of learning agents to perform a new task in a new domain by performing one or more operations selected from a group consisting of:

re-training a high-level strategy network to produce an optimal behavior, where optimality is based on maximizing reward signals obtained from episodes in the new domain;

re-training one or more low-level behavior networks to produce optimal behavior in the new domain; or adding and training new behaviors and re-training the high-level strategy network to select these new behaviors based on maximizing reward signals from the new domain.

15. The computer program product as set forth in claim 13, where a difficulty of obtaining positive rewards increases during training.

16. The computer program product as set forth in claim 13, where different learning agents are initialized and trained with different hyperparameters.

17. The computer program product as set forth in claim 13, wherein the low-level behavior includes a behavior selected from a group consisting of pursuit of opponents, evasion of opponents, and evasion of enemy projectiles.

18. The computer program product as set forth in claim 13, wherein a function is used for reinforcement learning by the learning agents, the function is based on a Kullback-Leibler divergence between an action probability distribution selected by a strategic agent that is being trained with reinforcement learning, and an average of all probability distributions for all of other strategic agents in the population.

* * * * *